United States Patent Office 2,995,558
Patented Aug. 8, 1961

2,995,558
PRODUCTION OF PYRIDINE HOMOLOGS
John E. Mahan and Stanley D. Turk, Bartlesville, Okla., assignors to Phillips Petroleum Company, a corporation of Delaware
No Drawing. Filed Nov. 5, 1957, Ser. No. 694,486
6 Claims. (Cl. 260—290)

This invention relates to a process for the production of pyridines. In one aspect this invention relates to a process for the production of alkyl substituted pyridines by catalytic condensation. In one specific embodiment this invention relates to a novel process for the production of 2-methyl-5-ethyl pyridine.

Pyridine homologs are useful as intermediate compounds in the production of pyridine derivatives containing unsaturated side chains, such as the vinyl pyridines which are capable of undergoing copolymerization with other unsaturated organic compounds, such as butadiene, to produce potentially useful synthetic rubbers. Vinyl pyridines can be prepared from pyridine homologs by various methods. One such compound is 2-methyl-5-ethyl pyridine which is also known as aldehyde collidine and aldehydin. For example, 2-methyl-5-ethyl pyridine may be reacted with formaldehyde to produce the monomethylol derivative which, upon dehydration, produces 2-vinyl-5-ethyl pyridine. Also, the ethyl group in 2-methyl-5-ethyl pyridine may be dehydrogenated to produce 2-methyl-5-vinyl pyridine. An object of this invention is to provide a convenient process for the production of pyridine homologs. Another object of the instant invention is to provide a process for the production of pyridine homologs from abundant and readily obtainable starting materials. Other objects and advantages of the invention will become apparent from the accompanying description and disclosure.

In accordance with this invention 2-methyl-5-ethyl pyridine can be prepared by the reaction of acetylene with aqueous ammonia at elevated temperature, in the presence of certain fluorine-containing catalysts. Other alkyl pyridine derivatives, on the other hand, can be prepared by using other acetylenic compounds in lieu of acetylene itself. We have also found that sulfonic acid catalysts can be employed in the reaction in lieu of the fluorine-containing catalysts of this invention.

This application is a continuation in part of our co-pending application filed January 12, 1953, Serial No. 330,885 for "Production of Pyridine Homologs," now abandoned.

The acetylenic compounds employed as starting materials include acetylene itself, which is the preferred reactant, and various alkyl and aryl substituted acetylenes, containing generally not to exceed ten carbon atoms per molecule. A preferred group of acetylenic compounds is one having the triple bond between an end carbon atom and a carbon atom adjacent thereto; and a particularly preferred group is such an acetylenic compound having not more than four carbon atoms. Examples of acetylenic compounds within the scope of this invention are methyl-acetylene, dimethylacetylene, ethylacetylene, propylacetylene, methylethylacetylene, phenylacetylene, tolylacetylene, vinylacetylene, diacetylene, the hexadiynes (e.g. dipropargyl), heptyne-1, butylacetylenes such as tert-butylacetylene, and the like. In the case of compounds difficult to use because of water insolubility, such as vinylacetylene or diacetylene, it will be necessary to employ a solvent, such as methanol, which will promote the reaction. However, such practice is within the skill of the art. Other materials such as allenes, which isomerize to form acetylenes under the conditions of the reaction, are also applicable. Allene, $CH_2=C=CH_2$, for example, undergoes isomerization to yield methylacetylene, $$CH_3C\equiv CH$$

Thus the reaction of acetylene with ammonia using the catalysts of this invention forms 2-methyl-5-ethyl pyridine in relatively high yields together with minor quantities of lower and higher boiling pyridine bases. Substituted acetylenes can be employed, to prepare pyridine derivatives of varying molecular weights. Mixtures of acetylenes can also be employed if desired to give products of varied character.

The aqueous ammonia employed in the process of this invention is an aqueous ammonia containing 5 to 95 weight percent ammonia.

As indicated the reaction of acetylenic compounds with aqueous ammonia to produce alkyl pyridine compounds in accordance with the practice of this invention can be advantageously carried out in the presence of selected fluorine-containing catalysts. Among the preferred catalysts can be named by way of example, hydrogen fluoride added as such; ammonium fluoride ($NH_4F$); ammonium bifluoride ($NH_4F \cdot HF$); alkali metal bifluorides especially sodium bifluoride and potassium bifluoride; zinc fluoride; iron fluoride especially ferric fluoride; the fluorides and bifluorides of the other metals of groups II to VIII of the periodic system, e.g. aluminum fluoride, titanium fluoride, tungsten fluoride, zirconium fluoride, vanadium fluoride, antimony fluoride, uranium fluoride, nickel fluoride; boron trifluoride; complexes of boron trifluoride especially complexes of boron trifluoride with water, ammonia, amines, organic acids, phosphoric acid, alcohols, ethers; the following acids added as such or as any of the salts thereof, especially the ammonium, metallic, and amine salts thereof; fluoboric acid, the fluorophosphoric acids, fluosilicic acid, fluorsulfonic acid, trifluoracetic acid; quaternary ammonium fluorides, for example trimethyl-benzyl ammonium fluorides; sulfur fluoride; chlorine trifluoride; the various oxygen fluorides; phosphorus fluoride (tri and penta). We have also found that sulfonic acid catalyst can be employed in the reaction in lieu of the fluorine-containing catalyst of this invention.

These fluorine-containing catalysts are generally employed in relatively small amounts. Usually from 0.2 percent to 10.0 percent by weight of catalyst based on the acetylenic compound is employed. Preferably from 1.5 to 5 weight percent is used based on the acetylenic compound. The mol ratio of ammonia to acetylenic compound is generally in the range of 0.25:1 to 4:1, preferably in the range of 0.4:1 to 3.0:1.

As indicated hereinbefore ammonia and the acetylenic compound are reacted at elevated temperature. Reaction temperatures normally are in the range of 200° F. to 700° F. However, we prefer that the reaction be carried out at a temperature of from 300° F. to 500° F. For best results sufficient pressure should be used to maintain the reaction mixture at least partly in liquid phase. Obviously this pressure will vary numerically with the temperature, the ammonia content of the reaction mixture and other factors understood by those skilled in the art. By way of example, pressure of from 500 to 5000 pounds per square inch gauge, can be used, the pressure ordinarily being in the range of from 750 to 2500 pounds per square inch gauge.

A suitable time will vary considerably with the different variables of the reaction, and will also be affected by choice of continuous flow or batch operation. In general the reaction time can be said to be from 0.25 to 24 hours, with a preferred range of 1 to 10 hours.

The preparation of alkyl pyridines and the nature of this invention are further illustrated by the following examples. The invention of course, is not restricted to these examples.

EXAMPLE I

Several runs were made to illustrate the utility of the fluorine containing catalyst for the condensation of acetylenic compounds with ammonia.

The reactions were carried out in a 1-liter, high pressure, stainless steel, stirred autoclave. The acetylene was drawn from pressured cylinders utilizing acetone as solvent. The ammonia used was 28 percent aqueous ammonia.

In each run 3 grams of catalyst and 100 ml. of aqueous ammonia was changed to the reactor. The reactor was pressure tested and flushed with nitrogen. The reactor was then changed with the desired amount of acetylene (220 to 245 p.s.i.) and heated to the desired reaction temperature. The maximum pressure was generally obtained when the contents first reached the reaction temperature. The reaction was stopped when the pressure leveled out. At the completion of the run, 8 to 9 hours, the agitation was ceased and the reactor cooled.

The pyridine content of the reaction mixture was determined by extracting the total soluble oils with ether, evaporating the ether on a steam bath, and then distilling the residual oils.

The data are summarized in Table I.

Table I

| Run No. | Catalyst | Temp., °C. | $C_2H_2$ Charged, gms. | $C_2H_2$ Used, gms. | $C_2H_2$ Conversion, Percent | Weight MEP,[1] gms. | Ultimate MEP Yield, Percent | Batch MEP Yield, Percent | Percent Heavies |
|---|---|---|---|---|---|---|---|---|---|
| 1 | $NH_4HF_2$ | 185 | 14.3 | 9.2 | 64.2 | 9.4 | 87.8 | 56.6 | 29 |
| 2 | $NiF_2$ | 185 | 14.0 | 10.7 | 76.4 | 6.0 | 56.1 | 42.9 | 44 |
| 3 | $NH_3$-$BF_3$ complex | 185 | 14.7 | 9.9 | 67.1 | 9.2 | 80.1 | 53.7 | 30 |
| 4 | Rosin amine silicofluoride | 185 | 14.6 | 9.8 | 67.0 | 8.7 | 76.3 | 51.2 | 44 |
| 5 | Methylamine silicofluoride | 185 | 15.6 | 10.4 | 66.7 | 9.4 | 77.7 | 52.0 | 28 |
| 6 | $NH_4F$ | 185 | 15.4 | 9.5 | 61.9 | 8.6 | 77.5 | 48.0 | 31 |
| 7 | None | 185 | 14.7 | 9.8 | 66.7 | 3.7 | 32.5 | 21.7 | 65 |

[1] 2-methyl-5-ethylpyridine.

From the above runs, it can be seen that these various fluorine containing catalysts promote the production of pyridines.

EXAMPLE II

Although water is utilized in the process of this invention, the fluorine containing catalyst does not promote hydration of the acetylene under the conditions of the condensation as is shown by the following run.

In this run an autoclave of about 2000 cc. capacity (glass-lined) was charged with 200 ml. of water and 3 grams of ammonium bifluoride after which the system was pressured to 200 p.s.i.g. with a 3 to 1 mixture of acetylene and propane. The temperature was elevated to 185° C. at which level the pressure was about 450 p.s.i.g., under which conditions the system was maintained for about 9 hours, during which no pressure drop was detectable.

At the end of the reaction period, the reactor was cooled, vented of acetylene and a sample of the contents remained. Analysis of the sample showed the presence of 0.083 percent acetaldehyde which is equivalent to about one half of one percent conversion based on the acetylene charged.

We often employ as a component of the reaction mixture a small quantity of a phosphate glass of an alkali metal or alkaline earth metal, or a pyrophosphate of ammonia or alkali metal or alkaline earth metal, as additional catalyst for the reaction, synergist for the fluorine-containing catalyst, and/or corrosion inhibitor. These phosphates also often aid in working up the products by reducing emulsion formation. The amount employed is preferably from 0.05 to 10, and more preferably from 0.1 to 6, weight percent based on the acetylenic compound charged. Calcium phosphate glasses can be used, but we usually employ water soluble alkali metal phosphate glasses, and prefer to use a water soluble sodium phosphate glass. Description of these glasses and the methods of producing them are contained in the articles by Partridge, Chemical and Engineering News 27, 214-217 (1949) and by Schwartz et al., Industrial and Engineering Chemistry 34, 32–40 (1942). The metal phosphate glasses and particularly the sodium phosphate glasses, are readily prepared by heating the corresponding metal metaphosphate to a temperature above its melting point and rapidly cooling the resulting liquid to form a vitreous or glassy product. The glasses contain $P_2O_5$ and metallic oxides in varying amounts, and the ratio of $P_2O_5$ and metallic oxides extends over a wide range. More specifically, the glasses we employ can contain a minor, say 0.1 mol percent, amount of metallic oxide, and the concentration of the metallic oxide may vary up to 60 mol percent. The preferred glass is available commercially, and it is known as sodium hexametaphosphate. This preferred glass contains equimolar proportions of $Na_2O$ and $P_2O_5$.

It has been noted hereinbefore that sulfonic acid catalysts can be employed in the reaction in lieu of the fluorine-containing catalysts of the invention. The catalysts include the alkyl, cycloalkyl, aryl, alkaryl, and aralkyl sulfonic acids having not more than ten carbon atoms per molecule, and the same substituted by non-interfering radicals. Also applicable are heterocyclic sulfonic acids, for example pyridine sulfonic acid, methylfuran sulfonic acid. Examples of the suitable sulfonic acids to be employed as catalysts in accordance with our invention are: ethane, chlorethane, propane, isobutane, pentane, difluoropentane, cyclohexane, methylcyclopentane, toluene, xylene, phenylethane, phenyl-iso-butane sulfonic acids. Presumably when the free acid is used a corresponding ammonium salt is formed in the reaction mixture. The ammonium salt can be added in the first instance, rather than the free acid. Salts of the sulfonic acids with organic bases are also suitable. For example salts of any of the sulfonic acids with amines, either primary, secondary or tertiary and either alkyl, cycloalkyl, aromatic, or heterocyclic, for example trimethylamine, butylamine, sec-hexylamine, pyridine, aniline, can be employed as catalysts of the invention. The preferred sulfonic acid catalysts are those containing no more than 10 carbon atoms per molecule and salts thereof with nitrogen-containing bases. However, metal salts of the said sulfonic acids which have sufficient solubility and provide in the reaction mixture adequate catalytic effect can also be used, for example alkali metal, alkaline earth metal, cobalt, titanium, aluminum salts.

Obviously many modifications or variations of the invention as hereinbefore set forth can be made without departing from the spirit and scope thereof.

We claim:

1. A process for the production of 2-methyl-5-ethyl pyridine which comprises reacting acetylene with aqueous ammonia having a concentration in the range 5 to 95 weight percent ammonia in a mol ratio of ammonia to acetylene of 0.4:1 to 3.0:1 at a temperature of from 300° F. to 500° F. at a pressure of from 750 pounds per square inch gauge to 2500 pounds per square inch gauge, and in the presence of an inorganic fluoride as a catalyst, the amount of said catalyst used being in the range of 1.5 to 5 by weight based on the acetylenic compound employed.

2. The process of claim 1 wherein said catalyst is ammonium bifluoride.

3. The process of claim 1 wherein said catalyst is ammonium fluoride.

4. The process of claim 1 wherein said catalyst is nickel fluoride.

5. The process of claim 1 wherein said catalyst is ammonia-boron fluoride complex.

6. The process of claim 1 wherein said catalyst is methylamine silicafluoride.

References Cited in the file of this patent

UNITED STATES PATENTS

| | | |
|---|---|---|
| 1,882,518 | Nicodemus | Oct. 11, 1932 |
| 2,615,022 | Mahan | Oct. 21, 1952 |
| 2,708,653 | Sisco et al. | May 17, 1955 |
| 2,744,904 | Cislak et al. | May 8, 1956 |
| 2,807,618 | Cislak et al. | Sept. 24, 1957 |

FOREIGN PATENTS

| | | |
|---|---|---|
| 332,623 | Great Britain | Oct. 4, 1929 |
| 334,193 | Great Britain | Aug. 25, 1930 |

OTHER REFERENCES

Maier-Bode et al.: "Pyridin und seine Derivate" (Wilhelm Knapp), p. 8–9 (1934).

Nozu et al.: Chem. Abstracts, vol. 37, p. 4399 (1943).

Murahashi et al.: Chem. Abstracts, vol. 45, p. 9052 (1951).

Raphael: Acetylenic Compounds In Organic Synthesis (1955), p. 185.

Migrdichian: Organic Synthesis, vol. 2 (1957), p. 992–4.